United States Patent [19]

Hoffman et al.

[11] Patent Number: 5,049,263
[45] Date of Patent: Sep. 17, 1991

[54] FLUID STRAINER WITH BLOCKAGE DETECTION

[75] Inventors: James R. Hoffman; Michael A. Ward, both of Cincinnati, Ohio

[73] Assignee: Cincinnati Milacron Inc., Cincinnati, Ohio

[21] Appl. No.: 543,004

[22] Filed: Jun. 25, 1990

Related U.S. Application Data

[63] Continuation-in-part of Ser. No. 529,018, May 25, 1990.

[51] Int. Cl.$^5$ .............................................. B01D 35/14
[52] U.S. Cl. ........................................ 210/86; 210/99; 210/452
[58] Field of Search .................... 210/86, 99, 106, 452, 210/744; 137/120, 558

[56] References Cited

U.S. PATENT DOCUMENTS

| 1,708,235 | 4/1929 | Nugent | 210/86 |
| 1,708,517 | 4/1929 | Nugent | 210/86 |
| 2,402,553 | 6/1946 | Hurt et al. | 210/86 |

OTHER PUBLICATIONS

Advertisement from German magazine *Werkstatt und Betrieb*, Jul. 1990; Wagner Machine Co.
Advertising brochure—Cincinnati Milacron Inc., Publication No. L-604-2, dated Mar. 1987.
Photocopies of selected pages of LAKOS Separator catalog: pp. 1, 2, 9, 11, 15, and 16.

*Primary Examiner*—W. Gary Jones
*Assistant Examiner*—Matthew O. Savage
*Attorney, Agent, or Firm*—Thomas M. Farrell

[57] ABSTRACT

A strainer cup strains a flow of particle-bearing fluid. When blocked, unstrained fluid overflows the cup spilling into a chamber. A switch detects a level of fluid and signals a blocked strainer cup condition, as the chamber drains off the unstrained fluid.

5 Claims, 2 Drawing Sheets

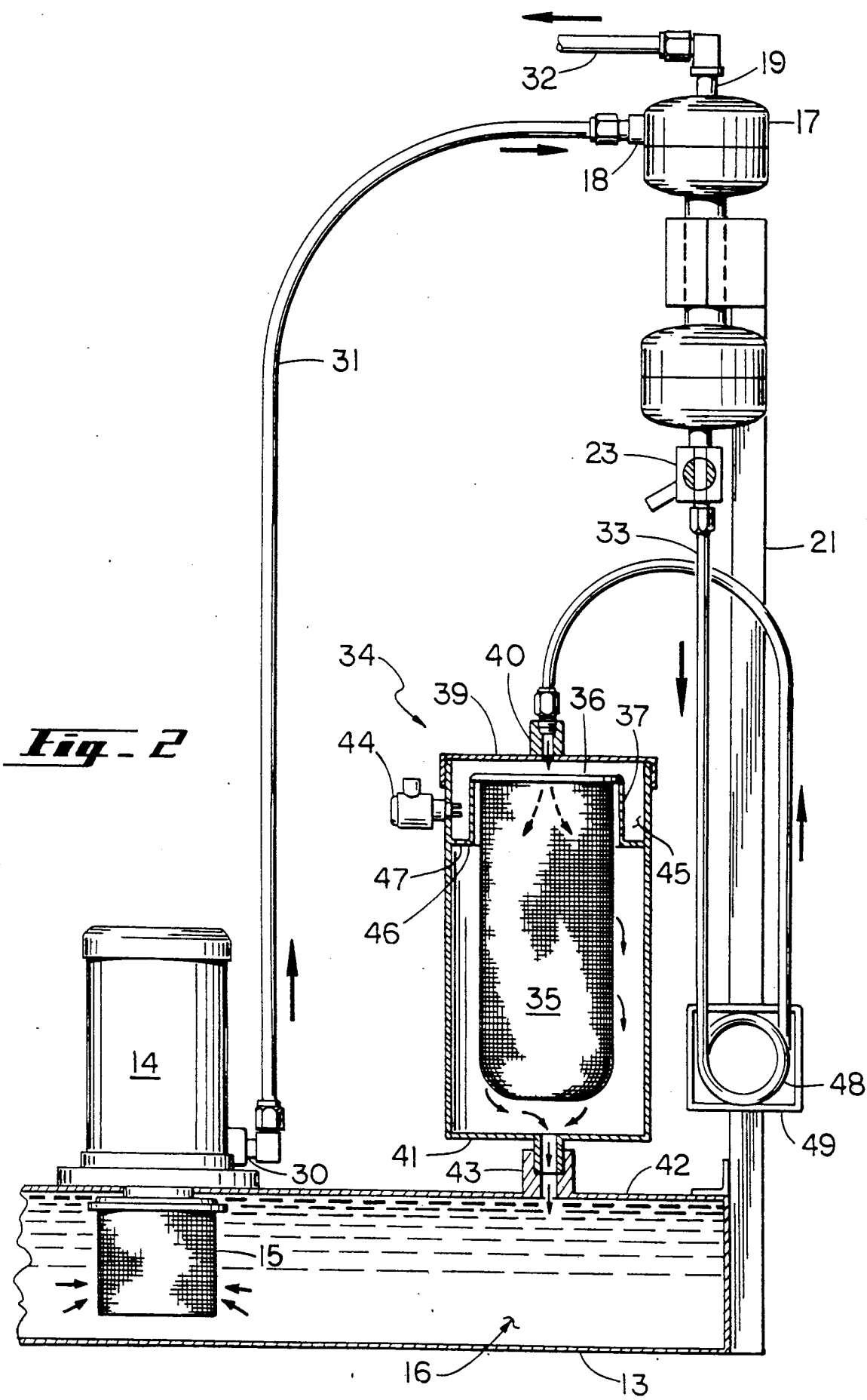
Fig_2

FLUID STRAINER WITH BLOCKAGE DETECTION

BACKGROUND OF THE INVENTION

This is a continuation-in-part of application Ser. No. 529,018 filed May 25, 1990.

The invention broadly relates to fluid systems requiring particle separation from a particle-bearing fluid stream.

In one exemplary embodiment, the invention relates to coolant filtration in a machine which has a pump and tank unit for supplying pressurized coolant to the machine, and wherein the coolant supply line is connected to a commercial coolant filter. The commercial filter has inlet and outlet ports for coolant flow, and a flushing port emitting a flow of particle-bearing coolant.

The invention will find use in systems in which the expected particles comprise metal granules, and identifiable flakes or chips, such as those produced in turning and milling machines.

The invention is especially adaptable to coolant systems employing one of a variety of commercially-available coolant filters, where a particle-bearing coolant stream emitted from the filter requires straining, and the strained coolant is returned to the coolant tank.

One commercial filter unit to which the invention is particularly well suited is the LAKOS In-Line Separator, available from Lakos Separators U.S.A., 1911 N. Helm, Fresno, Calif. 93703 which is a centrifugal unit where incoming coolant is swirled through a helical path which causes the particulate, contaminants to drop to the bottom of the unit, at a flushing port.

In order to properly flush this commercial filtration unit the manufacturer has suggested several methods and apparatus for flushing the unit: (a) an on/off air-operated or direct solenoid-operated gate valve for periodic flushing; (b) a pinch valve, for example, one having an air-operated rubber diaphragm adjustable to permit a small continuous bleed of contaminants with periodic automatic purge when the valve is pulled to the full-open position, and (c) a constant-bleed fixed orifice.

An additional constant-bleed flushing system, which makes use of a capillary tube, is the subject of a co-pending patent application, Ser. No. 529,018, entitled COOLANT FILTRATION, assigned to Cincinnati Milacron Inc., the assignee of this invention.

It is a desirable feature that a fluid strainer be cleared when blocked, and that maintenance personnel be aware of a "strainer-blocked" condition.

SUMMARY OF THE INVENTION

It is a broad object of the invention to provide a particle-bearing fluid stream with a strainer which will indicate a strainer-blocked condition, without requiring the fluid stream to stop.

It is also an object of the invention to provide a bleed line of a coolant filter or separator with a strainer for straining coolant from a particle-bearing coolant stream.

In accordance with the foregoing objects, the invention is shown embodied in a fluid strainer with blockage detection, comprising strainer means for receiving and straining a flow of particle-bearing fluid and accumulating particles while passing strained fluid; a chamber for receiving an overflow of unstrained fluid when the strainer means becomes blocked with particles; means for sensing a level of unstrained fluid in the chamber and signaling a blocked strainer means condition; and means for controlling drainage of the chamber while the level of unstrained fluid is sensed.

BRIEF DESCRIPTION OF THE DRAWINGS

FIG. 2 is a front elevational view of the coolant tank unit of FIG. 1, employing a constant bleed filter purging system, and having a fluid strainer with blockage detection means.

DESCRIPTION OF THE PREFERRED EMBODIMENT

Figure 1:
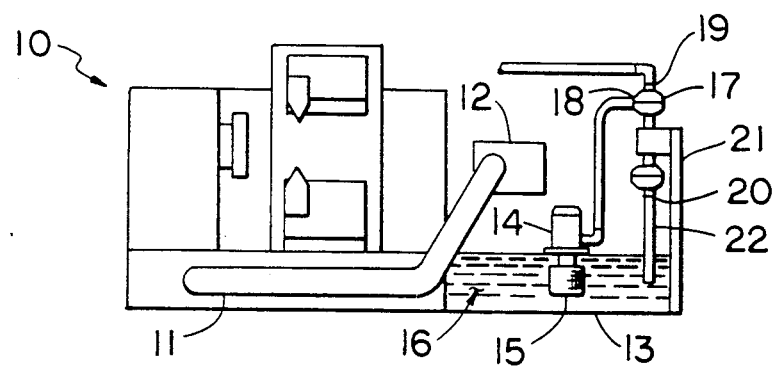
FIG. 1 is a front elevational diagrammatic view of a turning machine having a coolant supply system.

FIG. 1 of the drawings depicts, in diagrammatic form, a turning machine 10, for example, the CINTURN 4-axis CNC turning center available from Cincinnati Milacron Inc., the assignee of the present invention, wherein the base of the machine 10 is provided with a chip conveyor 11, well-known in the art, having a perforated metallic endless belt which collects chips falling from the work zone and conveys the chips to a clean-out box 12 located at a convenient height for an operator. Details of the chip conveyor 11 are unimportant, as it will suffice to know that the belt functions as an initial coarse screening arrangement, separating large chips and coolant falling on the belt. Coolant runs from the base of the machine to an adjacent, coolant tank 13 and, occasionally, smaller chips and particulate contamination may migrate into the coolant tank 13 as well. The coolant tank 13 is fitted with a motorized pump 14 having a screened intake 15 submerged in the coolant 16. The screened intake 15 will serve as a second filter for coolant that is to be returned to the machine 10 and used in the machining processes. The pump 14 is connected to a vertically-mounted commercial filter 17, in this example a LAKOS In-Line Separator, which has an inlet port 18, an outlet port 19, and a flushing port 20 at its bottom-most end. The filter 17 is supported on a bracket 21 above the coolant tank 13 and, in most cases, the flushing port line 22 will ultimately run to the coolant tank 13, to conserve coolant which is used to flush the contaminants from the filter 17. The coolant filter 17 depicted is a centrifugal unit, where particulants are removed under the influence of centrifugal force as coolant is swirled through the unit.

FIG. 2 illustrates the coolant tank 13 of FIG. 1 and the motorized pump 14, with its submerged screened intake 15. The commercial filter 17 is supported on the bracket 21 extending upward from the coolant tank 13, and, in a serial ducting arrangement, the outlet 30 of the pump 14 is connected by a tube 31 to the inlet port 18 of the filter 17; in turn, the outlet port 19 of the filter 17 has a tube 32 which runs to the machine 10. The flushing port 20 of the filter 17 is provided with a manual service valve 23, in normal operation fully open, but which may be turned to the blocked position for servicing the system. Extending downward from the manual service valve 23 is a flexible tubular conduit, in this case, cylindrical tubing 33, straight for (approximately) two feet (61 cm), coiled to a compact form and finally looped to connect with the top of a strainer unit 34. While the tubing 33 selected is soft plastic, it may be appreciated that substitute materials may be suitable.

The tubing cross-sectional passageway is sized to accommodate an expected maximum chip size of 0.38 inch (9,5 mm); though unlikely to do so, a thin, sliver-like chip might get through the screened intake 15 of the pump 14. In the system chosen, the pump output is 24 gallons per minute (91 liters per minute), leaving four gallons per minute (15 liters per minute) for the constant bleed system. The overall length of the 0.38 inch (9,5 mm) diameter tubing 33 is 41 feet (12,5 m), so the coiled portion 48 of the tubing 33 is compactly stored in a box 49 affixed to the bracket 21.

STRAINER UNIT

The strainer unit 34 contains a generally cylindrical perforate strainer cup means or filtration basket 35 made from fine mesh screen, having a closed bottom end and an open top end with a rim 36 supported on an upright wall or cylindrical collar 37 of a cylindrical strainer cup support base or support canister 38. The support canister 38 has a removable lid 39 with a suitable coupling 40 for anchoring the tubing 33. The integral bottom 41 of the support canister 38 is threadably received with the top plate 42 of the tank 13, through a coupling 43, to drain strained coolant into the tank 13. It is contemplated that the basket 35 will be removed and dumped periodically by maintenance personnel and, to assist as a reminder for that function, the top portion of the canister 38 has, as a sensor means, a fluid-sensing electrical switch 44 mounted through its side, extending into a top annular chamber 45 formed by an internal flange 46 carrying the collar 37. Should the basket 35 become too full, unstrained coolant will overflow the rim 36, filling the annular chamber 45 to the level of the switch 44, even as coolant drains through holes 47 in the flange 46. The switch signal can thereby alert an operator by sounding an annunciator (not shown) or lighting a "strainer-blocked" message on a control panel (not shown).

Figure 3:
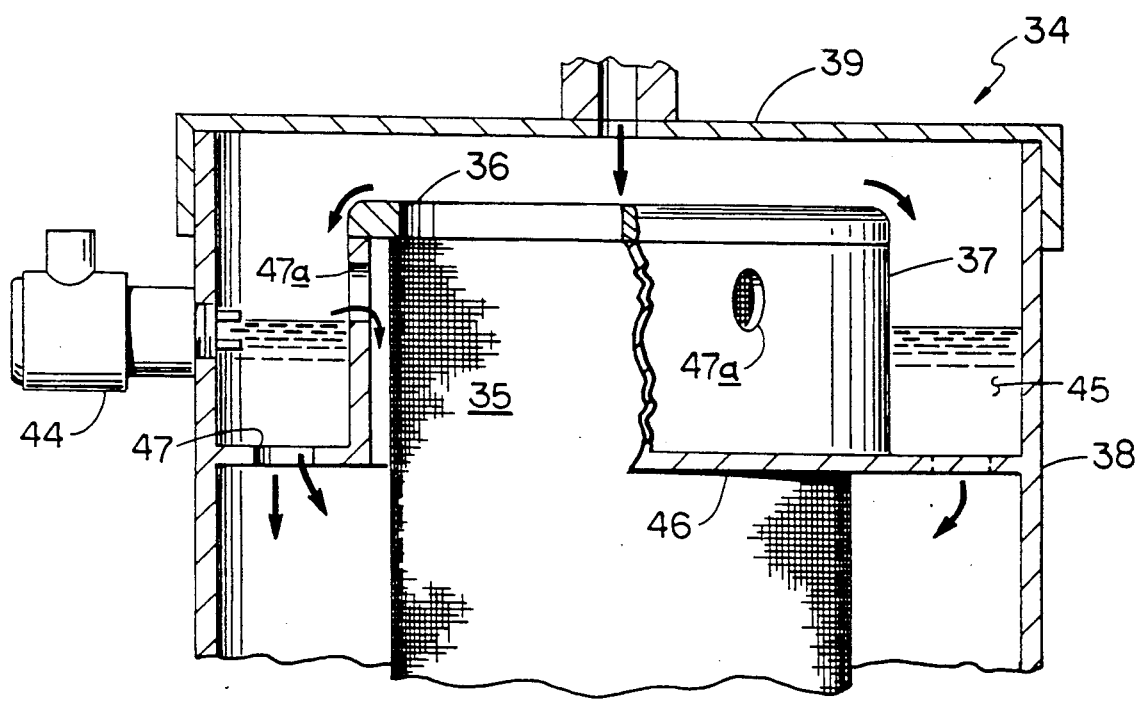
FIG. 3 is an enlarged view of the fluid strainer with blockage detection means of FIG. 2.

The enlarged sectional view of FIG. 3 shows an overflow means in the form of additional holes 47a which may be provided through the collar 37, to provide overflow of unstrained fluid from the annular chamber 45 once the fluid level switch 44 has been energized. It will be appreciated that an overflow from the annular chamber 45 may also be provided at the top of the collar 37, by merely spacing the rim 36 of the filtration basket 35 slightly above the collar 37.

When turning aluminum parts having high surface finish requirements, such as automobile wheels, it is important to prevent chips from returning to the work zone and ruining the finish. The invention has proved excellent for this application.

While the invention is shown in connection with a preferred embodiment, it is not intended that the invention be so limited, but rather, the invention extends to all such designs and modifications as come within the scope of the appended claims.

What is claimed is:

1. A fluid strainer with blockage detection, comprising:
    perforate strainer cup means for straining particle-bearing fluid and accumulating particles, said cup means having a top for receiving a flow of fluid and particles, a bottom and contiguous sidewall portion, said cup means passing at least a portion of said fluid flow while blocking the flow of at least a portion of said particles;
    a strainer cup support base, comprising an upstanding outer wall enclosing the outer periphery of an internal flange, an upstanding inner wall enclosing the periphery of an opening through said flange, said outer wall and said inner wall being integrally connected to said flange, thereby defining an annular chamber;
    means for supporting said strainer cup means on said strainer cup support base;
    rim means for permitting fluid to overflow said perforate strainer cup means and spill into said annular chamber when said strainer cup means is substantially blocked with accumulated particles;
    means for mounting said strainer cup support base relative to a fluid reservoir;
    means for draining fluid flow passing through said strainer cup means into said fluid reservoir;
    means for directing a flow of fluid and particles into said strainer cup means;
    sensor means for sensing a fluid level in said annular chamber relative to said flange;
    means for controlling drainage of fluid from said annular chamber as said sensor means senses said fluid level; and
    signal means for effecting a personnel alert condition in response to said sensor means.

2. The apparatus of claim 1, wherein said strainer cup means is supported on said inner wall of said support base, in line with said opening.

3. The apparatus of claim 2, wherein said rim means includes a rim proximate the top of said strainer cup means supported on said inner wall, and said bottom and contiguous sidewall portion of said strainer cup means extends from said rim through said opening.

4. The apparatus of claim 3, wherein said support base further comprises a canister-like body for catching and controlling strained fluid.

5. The apparatus of claim 4, further comprising a lid covering said rim and said annular chamber, the lid including a fluid connector.

* * * * *